(12) United States Patent
Maruhashi et al.

(10) Patent No.: US 10,707,532 B2
(45) Date of Patent: Jul. 7, 2020

(54) COMPOSITION FOR ADHESIVE LAYER OF NON-AQUEOUS SECONDARY BATTERY, ADHESIVE LAYER FOR NON-AQUEOUS SECONDARY BATTERY, ADHESIVE LAYER-EQUIPPED SEPARATOR FOR NON-AQUEOUS SECONDARY BATTERY, ADHESIVE LAYER-EQUIPPED ELECTRODE FOR NON-AQUEOUS SECONDARY BATTERY, NON-AQUEOUS SECONDARY BATTERY, AND METHOD FOR PRODUCING SAME

(71) Applicant: ZEON CORPORATION, Chiyoda-ku, Tokyo (JP)

(72) Inventors: Yutaka Maruhashi, Tokyo (JP); Junnosuke Akiike, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/765,007

(22) PCT Filed: Oct. 7, 2016

(86) PCT No.: PCT/JP2016/004529
§ 371 (c)(1),
(2) Date: Mar. 30, 2018

(87) PCT Pub. No.: WO2017/073022
PCT Pub. Date: May 4, 2017

(65) Prior Publication Data
US 2018/0287189 A1   Oct. 4, 2018

(30) Foreign Application Priority Data

Oct. 28, 2015 (JP) ................. 2015-211861

(51) Int. Cl.
| | | |
|---|---|---|
| *C09J 133/10* | (2006.01) | |
| *C09J 133/26* | (2006.01) | |
| *C08L 33/10* | (2006.01) | |
| *H01M 2/16* | (2006.01) | |
| *H01M 4/131* | (2010.01) | |
| *H01M 4/133* | (2010.01) | |
| *H01M 4/1391* | (2010.01) | |
| *H01M 4/1393* | (2010.01) | |
| *H01M 4/525* | (2010.01) | |
| *H01M 4/587* | (2010.01) | |
| *H01M 10/0525* | (2010.01) | |
| *H01M 10/0565* | (2010.01) | |
| *H01M 10/058* | (2010.01) | |

(52) U.S. Cl.
CPC .......... *H01M 10/058* (2013.01); *C08L 33/10* (2013.01); *C09J 133/10* (2013.01); *C09J 133/26* (2013.01); *H01M 2/1653* (2013.01); *H01M 2/1686* (2013.01); *H01M 4/131* (2013.01); *H01M 4/133* (2013.01); *H01M 4/1391* (2013.01); *H01M 4/1393* (2013.01); *H01M 10/0525* (2013.01); *H01M 10/0565* (2013.01); *C08L 2205/025* (2013.01); *C09J 2433/003* (2013.01); *H01M 4/525* (2013.01); *H01M 4/587* (2013.01); *H01M 2300/0097* (2013.01)

(58) Field of Classification Search
CPC ... C08L 33/10; C08L 2205/025; C09J 133/10; C09J 133/26; C09J 2433/003; H01M 2/1653; H01M 2/1686; H01M 4/131; H01M 4/133; H01M 4/1391; H01M 4/1393; H01M 4/525; H01M 4/587; H01M 10/0525; H01M 10/0565; H01M 10/058; H01M 2300/0097
See application file for complete search history.

(56) References Cited

U.S. PATENT DOCUMENTS

| | | | |
|---|---|---|---|
| 2013/0330622 A1 | 12/2013 | Sasaki et al. | |
| 2015/0125755 A1* | 5/2015 | Ishii ..................... | H01M 4/621 429/233 |

(Continued)

FOREIGN PATENT DOCUMENTS

| | | |
|---|---|---|
| CN | 104428920 A | 3/2015 |
| JP | 2012204303 A | 10/2012 |
| JP | 2013145763 A | 7/2013 |

(Continued)

OTHER PUBLICATIONS

R. D. Collier-Calibration with confidence—the assurance of temperature accuracy, http://web.stanford.edu/group/csp/cs21/calibration.html, available on-line since 2015 (Year: 2015).*

(Continued)

*Primary Examiner* — Anca Eoff
(74) *Attorney, Agent, or Firm* — Kenja IP Law PC

(57) ABSTRACT

Provided is a composition for an adhesive layer of a non-aqueous secondary battery allowing formation of an adhesive layer that can achieve both high process adhesiveness and high blocking resistance in battery members such as an electrode and a separator. The presently disclosed composition for an adhesive layer of a non-aqueous secondary battery includes a particulate polymer A that has a glass-transition temperature of no higher than 20° C. and a volume-average particle diameter of at least 100 nm and less than 450 nm, and a particulate polymer B that has a glass-transition temperature of at least 30° C. and less than 60° C. and a volume-average particle diameter larger than the volume-average particle diameter of the particulate polymer A.

9 Claims, No Drawings

(56) References Cited

U.S. PATENT DOCUMENTS

2015/0188108 A1    7/2015  Miyazawa et al.
2015/0311490 A1*  10/2015  Murase ................ H01M 4/139
                                                                429/131

FOREIGN PATENT DOCUMENTS

| JP | 2015041603 A | | 3/2015 |
|----|----|----|----|
| WO | 2012115096 A1 | | 8/2012 |
| WO | WO 2013/180166 | * | 12/2013 |
| WO | 2014017651 A1 | | 1/2014 |
| WO | WO 2014/081035 | * | 5/2014 |

OTHER PUBLICATIONS

Jan. 10, 2017, International Search Report issued in the International Patent Application No. PCT/JP2016/004529.

May 24, 2019, the Extended European Search Report issued by the European Patent Office in the corresponding European Patent Application No. 16859262.4.

May 1, 2018, International Preliminary Report on Patentability issued in the International Patent Application No. PCT/JP2016/004529.

* cited by examiner

COMPOSITION FOR ADHESIVE LAYER OF NON-AQUEOUS SECONDARY BATTERY, ADHESIVE LAYER FOR NON-AQUEOUS SECONDARY BATTERY, ADHESIVE LAYER-EQUIPPED SEPARATOR FOR NON-AQUEOUS SECONDARY BATTERY, ADHESIVE LAYER-EQUIPPED ELECTRODE FOR NON-AQUEOUS SECONDARY BATTERY, NON-AQUEOUS SECONDARY BATTERY, AND METHOD FOR PRODUCING SAME

TECHNICAL FIELD

The present disclosure relates to a composition for an adhesive layer of a non-aqueous secondary battery, an adhesive layer for a non-aqueous secondary battery, an adhesive layer-equipped separator for a non-aqueous secondary battery, an adhesive layer-equipped electrode for a non-aqueous secondary battery, a non-aqueous secondary battery, and a method for producing a non-aqueous secondary battery.

BACKGROUND

Non-aqueous secondary batteries (also simply referred to below as "secondary batteries") such as lithium ion secondary batteries are small and light, high in energy density, and capable of repeated charging and discharging. Such secondary batteries are therefore used in a wide variety of applications. In recent years, improvements in battery members have been studied to obtain even better performance of non-aqueous secondary batteries.

A secondary battery such as a lithium ion secondary battery generally includes battery members such as electrodes (a positive electrode and a negative electrode) and a separator that isolates the positive and negative electrodes from each another to prevent the electrodes from short-circuiting. An adhesive layer or the like for improving the adhesiveness between battery members may be provided on the surface of the electrodes and/or the separator. Specifically, an adhesive layer-equipped electrode obtained by further forming an adhesive layer on an electrode and an adhesive layer-equipped separator obtained by forming an adhesive layer on a separator are used as battery members.

In the production process of a secondary battery, a battery member produced to be long is typically wound as produced and then stored and transported. However, if a battery member including an adhesive layer, such as an adhesive layer-equipped electrode or an adhesive layer-equipped separator, is stored and transported in a wound state, adjacent battery members may adhere via the adhesive layer. That is, defects and a reduction in productivity may occur due to blocking. Accordingly, a battery member that includes an adhesive layer is required to have the capability of inhibiting blocking during the production process (blocking resistance).

Patent literature (PTL) 1, for example, proposes an adhesive for a lithium ion secondary battery, the adhesive including a particulate polymer that has a glass-transition temperature of at least −60° C. and no higher than 20° C. and a particle diameter D50 of at least 300 nm and not greater than 700 nm, and another particulate polymer that has a glass-transition temperature of at least 60° C. and no higher than 150° C., a predetermined particle diameter, and a predetermined degree of swelling in electrolysis solution. Forming an adhesive layer using the adhesive that includes the aforementioned particulate polymer with a high glass-transition temperature and the aforementioned particulate polymer with a low glass-transition temperature as in PTL 1 improves the blocking resistance of the battery member that includes the formed adhesive layer while also improving the adhesiveness between battery members after immersion in an electrolysis solution.

CITATION LIST

Patent Literature

PTL 1: JP 2015-41603 A

SUMMARY

Technical Problem

In the production process of a secondary battery, battery members may be stacked before immersion in an electrolysis solution and cut to a desired size as necessary and may be transported as a laminate. During such cutting or transportation, stacked battery members may become misaligned, leading to problems such as defects and a reduction in productivity. In addition to the above-described blocking resistance, battery members are therefore required also to have high adhesiveness (process adhesiveness) between battery members during the battery production process. The need for such process adhesiveness has particularly increased in recent years as batteries have become larger.

The battery member including an adhesive layer formed using the adhesive for a lithium ion secondary battery disclosed in PTL 1, however, has room for improvement in achieving both process adhesiveness between battery members and a high level of blocking resistance during the battery production process (i.e. before immersion in an electrolysis solution).

Accordingly, one objective of the present disclosure is to provide a composition for an adhesive layer of a non-aqueous secondary battery allowing formation of an adhesive layer that can achieve both high process adhesiveness and high blocking resistance in battery members such as an electrode and a separator.

Another objective of the present disclosure is to provide an adhesive layer for a non-aqueous secondary battery that can achieve both high process adhesiveness and high blocking resistance in battery members such as an electrode and a separator.

Still another objective of the present disclosure is to provide an adhesive layer-equipped separator for a non-aqueous secondary battery, and an adhesive layer-equipped electrode for a non-aqueous secondary battery, that have both high process adhesiveness and high blocking resistance.

Still another objective of the present disclosure is to provide a non-aqueous secondary battery with excellent cell characteristics, such as output characteristics (in particular, low-temperature output characteristics).

Still another objective of the present disclosure is to provide a method for producing a non-aqueous secondary battery that allows production of a non-aqueous secondary battery with excellent cell characteristics, such as output characteristics, while improving the process adhesiveness and blocking resistance of the battery members.

Solution to Problem

We conducted diligent investigation with the aim of solving the problems described above. We focused on using a composition for an adhesive layer of a non-aqueous secondary battery containing two types of particulate polymers with different predetermined glass-transition temperatures and volume-average particle diameters. We discovered that using this composition for an adhesive layer allows formation of an adhesive layer that can achieve good process adhesiveness and blocking resistance in an electrode, a separator, and the like during the battery production process. We also discovered that using this composition for an adhesive layer allows production of a non-aqueous secondary battery with excellent cell characteristics, such as output characteristics, while improving the process adhesiveness and blocking resistance of battery members, thereby completing the present disclosure.

Specifically, the present disclosure aims to advantageously solve the problems described above by disclosing a composition for an adhesive layer of a non-aqueous secondary battery that comprises a particulate polymer A and a particulate polymer B, wherein the particulate polymer A has a glass-transition temperature of no higher than 20° C. and a volume-average particle diameter of at least 100 nm and less than 450 nm, and the particulate polymer B has a glass-transition temperature of at least 30° C. and less than 60° C. and a volume-average particle diameter larger than the volume-average particle diameter of the particulate polymer A. By such inclusion of two types of particulate polymers that have predetermined glass-transition temperatures and volume-average particle diameters, a battery member that includes an adhesive layer formed using this composition for an adhesive layer of a non-aqueous secondary battery can be provided with both high process adhesiveness and high blocking resistance.

In the present disclosure, the "glass-transition temperature" can be calculated from a differential scanning calorimetry (DSC) curve obtained using a differential scanning calorimeter (reference material: aluminum).

Furthermore, in the present disclosure, the "volume-average particle diameter" refers to the particle diameter at which, in a (volume-based) particle diameter distribution measured by a laser diffraction method, the cumulative volume calculated from the small diameter end reaches 50% (D50).

In the presently disclosed composition for an adhesive layer of a non-aqueous secondary battery, the content of the particulate polymer A is preferably at least 20 parts by mass and no greater than 70 parts by mass per 100 parts by mass of the particulate polymer B. By the content of the particulate polymer A being set within the aforementioned range, the blocking resistance and process adhesiveness of a battery member including an adhesive layer formed using the composition for an adhesive layer of a non-aqueous secondary battery can be further improved.

The degree of swelling in electrolysis solution of the particulate polymer A is preferably at least a factor of 1 and no greater than a factor of 10. By the degree of swelling in electrolysis solution of the particulate polymer A being set within the aforementioned range, a rise in the internal resistance can be inhibited and output characteristics can be improved in a non-aqueous secondary battery provided with the adhesive layer formed using the composition for an adhesive layer of a non-aqueous secondary battery.

In the present disclosure, the "degree of swelling in electrolysis solution" can be measured using the measurement method described in the Examples section.

The degree of swelling in electrolysis solution of the particulate polymer B is preferably at least a factor of 6. By the degree of swelling in electrolysis solution of the particulate polymer B being set to at least a factor of 6, a rise in the internal resistance can be inhibited and output characteristics can be further improved in a non-aqueous secondary battery provided with the adhesive layer formed using the composition for an adhesive layer of a non-aqueous secondary battery.

The volume-average particle diameter of the particulate polymer B is preferably at least 200 nm and no greater than 900 nm. By the volume-average particle diameter of the particulate polymer B being set within the aforementioned range, the blocking resistance of a battery member including an adhesive layer formed using the composition for an adhesive layer of a non-aqueous secondary battery can be further improved.

The present disclosure also aims to advantageously solve the problems described above by disclosing an adhesive layer for a non-aqueous secondary battery, the adhesive layer being formed by using any one of the above-described compositions for a non-aqueous secondary battery adhesive layer. Through use of such a composition for an adhesive layer that includes two types of particulate polymers that have predetermined glass-transition temperatures and volume-average particle diameters, an adhesive layer that can achieve both high process adhesiveness and high blocking resistance in a battery member can be obtained.

The present disclosure also aims to advantageously solve the problems described above by disclosing an adhesive layer-equipped separator for a non-aqueous secondary battery, the adhesive layer-equipped separator comprising a separator and the above-described adhesive layer for a non-aqueous secondary battery provided on at least one surface of the separator. By the presently disclosed adhesive layer for a non-aqueous secondary battery thus being provided on at least one surface of the separator, the blocking resistance of the separator can be improved, while improving the process adhesiveness between the electrode and the separator during the battery production process.

The present disclosure also aims to advantageously solve the problems described above by disclosing an adhesive layer-equipped electrode for a non-aqueous secondary battery, the adhesive layer-equipped electrode comprising an electrode and the above-described adhesive layer for a non-aqueous secondary battery provided on at least one surface of the electrode. By the presently disclosed adhesive layer for a non-aqueous secondary battery thus being provided on at least one surface of the electrode, the blocking resistance of the electrode can be improved, while improving the process adhesiveness between the electrode and the separator during the battery production process.

The present disclosure also aims to advantageously solve the problems described above by disclosing a non-aqueous secondary battery comprising a positive electrode, a negative electrode, a separator, and the above-described presently disclosed adhesive layer for a non-aqueous secondary battery, wherein the adhesive layer for a non-aqueous secondary battery is arranged between the positive electrode and the separator and/or between the negative electrode and the separator. By the above-described adhesive layer for a non-aqueous secondary battery thus being arranged between the positive electrode and the separator and/or between the negative electrode and the separator, the internal resistance of the secondary battery that is produced can be lowered, and the cell characteristics, such as output characteristics, can be sufficiently improved.

The present disclosure also aims to advantageously solve the problems described above by disclosing a method for producing a non-aqueous secondary battery, the method comprising forming an adhesive layer for a non-aqueous secondary battery on at least one of a positive electrode, a negative electrode, and a separator using the above-described presently disclosed composition for an adhesive layer of a non-aqueous secondary battery. By such inclusion of a step of forming a predetermined adhesive layer at a predetermined position, a non-aqueous secondary battery with excellent cell characteristics, such as output characteristics, can be produced while improving the process adhesiveness and blocking resistance of the battery members.

Advantageous Effect

The present disclosure can provide an adhesive layer for a non-aqueous secondary battery that can achieve both high process adhesiveness and high blocking resistance in battery members such as an electrode and a separator and can provide a composition for an adhesive layer of a non-aqueous secondary battery capable of forming this adhesive layer.

The present disclosure can also provide an adhesive layer-equipped separator for a non-aqueous secondary battery, and an adhesive layer-equipped electrode for a non-aqueous secondary battery, that have both high process adhesiveness and high blocking resistance.

The present disclosure can also provide a non-aqueous secondary battery with excellent cell characteristics, such as output characteristics, and a method for producing a non-aqueous secondary battery that allows production of the non-aqueous secondary battery while improving the process adhesiveness and blocking resistance of the battery members.

DETAILED DESCRIPTION

Embodiments of the present disclosure will now be described.

The presently disclosed composition for an adhesive layer of a non-aqueous secondary battery can be used when forming an adhesive layer for a non-aqueous secondary battery. The adhesive layer formed using the composition for an adhesive layer of a non-aqueous secondary battery can be used when adhering a separator and an electrode. The adhesive layer-equipped separator for a non-aqueous secondary battery or adhesive layer-equipped electrode for a non-aqueous secondary battery obtained by using the composition for an adhesive layer of a non-aqueous secondary battery to form an adhesive layer for a non-aqueous secondary battery on a separator or an electrode can be suitably used when producing a non-aqueous secondary battery such as a lithium ion secondary battery. The presently disclosed non-aqueous secondary battery includes the presently disclosed adhesive layer for a non-aqueous secondary battery between the positive electrode and the separator and/or between the negative electrode and the separator. The presently disclosed non-aqueous secondary battery can, for example, be produced using the presently disclosed method for producing a non-aqueous secondary battery.

The presently disclosed composition for an adhesive layer of a non-aqueous secondary battery and adhesive layer for a non-aqueous secondary battery can be suitably used in particular when producing an adhesive layer-equipped separator for a non-aqueous secondary battery. The member on which the adhesive layer is formed, such as the electrode, the separator, or the like, is also referred to below simply as a "substrate".

(Composition for Adhesive Layer of Non-Aqueous Secondary Battery)

The presently disclosed composition for an adhesive layer of a non-aqueous secondary battery contains a particulate polymer A having a predetermined glass-transition temperature and a predetermined volume-average particle diameter and a particulate polymer B having a predetermined glass-transition temperature and a predetermined volume-average particle diameter that differ from those of the particulate polymer A. The composition for an adhesive layer of a non-aqueous secondary battery is normally a slurry composition with water or the like as a dispersion medium and can include any additives in addition to the aforementioned particulate polymers and dispersion medium. Because the presently disclosed composition for an adhesive layer of a non-aqueous secondary battery includes at least two types of particulate polymers, good process adhesiveness is obtained between the electrode and the separator during the battery production process when an adhesive layer for a non-aqueous secondary battery is provided on the electrode or the separator using the composition for an adhesive layer. Good blocking resistance is also obtained for the electrode provided with the adhesive layer and the separator provided with the adhesive layer.

<Particulate Polymer A>

When an adhesive layer is provided on the substrate, such as the separator or electrode, using the composition for an adhesive layer of a non-aqueous secondary battery that includes the particulate polymer A, the particulate polymer A has the function of allowing the particulate polymer A itself and the particulate polymer B used in combination to adhere well to the substrate. In other words, the particulate polymer A allows the adhesive layer for a non-aqueous secondary battery formed on the substrate to achieve good adhesiveness with the substrate. Furthermore, via the adhesive layer for a non-aqueous secondary battery containing the particulate polymer A, the particulate polymer A also has the function of adhering the electrode and the separator with good process adhesiveness and of preventing misalignment of the separator or the like during the battery production process.

<<Properties>>

[Glass-Transition Temperature]

Here, the glass-transition temperature of the particulate polymer A needs to be no higher than 20° C. The glass-transition temperature of the particulate polymer A is preferably no higher than 10° C., more preferably no higher than 5° C., even more preferably no higher than −10° C., and still more preferably no higher than −20° C., and is preferably at least −60° C., more preferably at least −50° C., and even more preferably at least −40° C. By inclusion of the particulate polymer A with a glass-transition temperature of no higher than 20° C. in the composition for an adhesive layer, a battery member including an adhesive layer formed using the composition for an adhesive layer can be provided with high process adhesiveness, and dusting of the adhesive layer formed by good adhesion between the substrate and the adhesive layer can be inhibited. Furthermore, if the glass-transition temperature of the particulate polymer A is at least −60° C., the particulate polymer A can be prepared easily, and a battery member including the adhesive layer achieves good blocking resistance.

[Volume-Average Particle Diameter]

The volume-average particle diameter of the particulate polymer A needs to be at least 100 nm and less than 450 nm. The volume-average particle diameter of the particulate polymer A is preferably at least 200 nm and more preferably at least 300 nm and is preferably no greater than 400 nm and more preferably less than 400 nm. If the volume-average particle diameter of the particulate polymer A is at least 100 nm, the stability of the slurry composition constituting the composition for an adhesive layer can be improved. Specifically, when stirring the composition for an adhesive layer with a high shear force and when coating at high speed, the occurrence of aggregations in the composition for an adhesive layer can be inhibited. Furthermore, if the volume-average particle diameter of the particulate polymer A is less than 450 nm and moreover is smaller than the volume-average particle diameter of the particulate polymer B, the blocking resistance of the battery member including the formed adhesive layer can be improved.

The volume-average particle diameter of the particulate polymer A can be adjusted to within a desired range by, for example, the type of particulate polymers, the polymerization method, the polymerization conditions, or by separating or classifying precipitates of the obtained polymer.

[Degree of Swelling in Electrolysis Solution]

The degree of swelling in electrolysis solution of the particulate polymer A is preferably at least a factor of 1, more preferably at least a factor of 2, and even more preferably at least a factor of 3, and is preferably at most a factor of 10, more preferably at most a factor of 8, even more preferably at most a factor of 6, and still more preferably at most a factor of 5. If the degree of swelling in electrolysis solution of the particulate polymer A is at least a factor of 1, the ion conductivity increases and a rise in internal resistance can be inhibited in a secondary battery provided with the adhesive layer containing the particulate polymer A. Consequently, the produced secondary battery can be provided with excellent output characteristics. Furthermore, if the degree of swelling in electrolysis solution of the particulate polymer A is no greater than a factor of 10, the particulate polymer A included in the adhesive layer can be prevented from swelling excessively in electrolysis solution and reducing the gaps in the adhesive layer (which are filled by the swollen particulate polymer A), and a reduction in the ion conductivity of the adhesive layer can be inhibited. As a result, a rise in the resistance of the produced secondary battery is inhibited, yielding good output characteristics.

<<Content>>

The content of the particulate polymer A in the composition for an adhesive layer of a non-aqueous secondary battery per 100 parts by mass of the particulate polymer B is preferably at least 20 parts by mass, more preferably at least 25 parts by mass, even more preferably at least 30 parts by mass, and still more preferably at least 40, and is preferably no greater than 70 parts by mass, more preferably no greater than 65 parts by mass, and even more preferably no greater than 60 parts by mass. If the content of the particulate polymer A is at least the aforementioned lower limit, the substrate and the adhesive layer formed on the substrate adhere well because of the contribution of the particulate polymer A. Additionally, the process adhesiveness of the battery members (adhesive layer-equipped electrode, adhesive layer-equipped separator) obtained by forming an adhesive layer on a substrate can be further improved. Furthermore, if the content of the particulate polymer A is no greater than the aforementioned upper limit, a rise in internal resistance is inhibited by inhibiting the reduction in gaps in the adhesive layer, and because of the contribution of the particulate polymer B used in combination, the blocking resistance of the battery members that include the adhesive layer can be further improved.

<<Composition>>

The polymer constituting the particulate polymer A is not specifically limited so long as the polymer has the above-described glass-transition temperature and volume-average particle diameter, and any polymer such as an acrylic-based polymer, a conjugated diene-based polymer, or an unsaturated carboxylic acid-based polymer can be used.

Here, a conjugated diene-based polymer refers to a polymer containing a conjugated diene monomer unit. Examples of the conjugated diene-based polymer are not specifically limited and include a copolymer including an aromatic vinyl monomer unit and an aliphatic conjugated diene monomer unit, such as a styrene-butadiene copolymer (SBR); butadiene rubber (BR); acrylic rubber (NBR) (a copolymer including an acrylonitrile unit and a butadiene unit); hydrides thereof; and the like.

The acrylic-based polymer is a polymer that includes a (meth)acrylic acid ester monomer unit. Here, a (meth)acrylic acid alkyl ester such as methyl acrylate, ethyl acrylate, butyl acrylate, methyl methacrylate, ethyl methacrylate, 2-ethylhexyl acrylate, or the like can be used as the (meth)acrylic acid ester monomer that can form a (meth)acrylic acid ester monomer unit.

In the present disclosure, "(meth)acryl" is used to indicate "acryl" and/or "methacryl".

The unsaturated carboxylic acid-based polymer is a polymer that includes an unsaturated carboxylic acid monomer unit. Here, acrylic acid, methacrylic acid, itaconic acid, and the like can be used as the unsaturated carboxylic acid that can form an unsaturated carboxylic acid monomer unit.

<<Method for Preparing Particulate Polymer A>>

No specific limitations are placed on the mode of polymerization of the particulate polymer A. For example, any method among solution polymerization, suspension polymerization, bulk polymerization, and emulsion polymerization may be used. As the polymerization reaction, addition polymerization such as ionic polymerization, radical polymerization, or living radical polymerization can be used. The polymerization may be carried out with a commonly used emulsifier, dispersant, polymerization initiator, chain transfer agent, or the like that are usable for polymerization, and the amount thereof may also be the same as commonly used.

<Particulate Polymer B>

The particulate polymer B has the function of allowing battery members provided with the adhesive layer for a non-aqueous secondary battery formed using the composition for an adhesive layer of a non-aqueous secondary battery that contains the particulate polymer A and the particulate polymer B to achieve high blocking resistance and process adhesiveness. In other words, when a battery member provided with the adhesive layer for a non-aqueous secondary battery that contains the particulate polymer B is wound as produced and then stored and transported, the particulate polymer B has the function of inhibiting adhesion between adjacent battery members via the adhesive layer and also of adhering the electrode and the separator with good process adhesiveness and of preventing misalignment of the separator and the like during the battery production process.

<<Properties>>

[Glass-Transition Temperature]

Here, the glass-transition temperature of the particulate polymer B needs to be at least 30° C. and less than 60° C. In other words, the glass-transition temperature of the particulate polymer B is higher than the glass-transition temperature of the above-described particulate polymer A. The glass-transition temperature of the particulate polymer B is preferably at least 35° C. and more preferably at least 40° C. and is preferably no higher than 55° C. and more preferably no higher than 50° C. By inclusion of the particulate polymer B with a glass-transition temperature of at least 30° C. in the composition for an adhesive layer, a battery member including the adhesive layer formed using the composition for an adhesive layer can be provided with excellent blocking resistance during storage or transportation of the battery member. Furthermore, by inclusion of the particulate polymer B with the glass-transition temperature of less than 60° C. in the composition for an adhesive layer, a battery member including the adhesive layer can be provided with high blocking resistance while also being provided with good process adhesiveness.

[Volume-Average Particle Diameter]

The volume-average particle diameter of the particulate polymer B needs to be larger than the volume-average particle diameter of the particulate polymer A. For example, the volume-average particle diameter of the particulate polymer B is preferably at least 1.1 times larger than the volume-average particle diameter of the particulate polymer A and is more preferably at least 1.2 times larger. If the particle diameter of the particulate polymer B, which has a relatively low adhesive strength at a normal temperature due to the high glass-transition temperature, is larger than the particle diameter of the particulate polymer A, which has a low glass-transition temperature and achieves high adhesive strength, then the particulate polymer B functions like a spacer and can inhibit blocking.

The volume-average particle diameter of the particulate polymer B is preferably at least 200 nm, more preferably at least 300 nm, even more preferably at least 400 nm, and still more preferably at least 470 nm, and is preferably no greater than 900 nm, more preferably no greater than 800 nm, even more preferably no greater than 700 nm, and still more preferably no greater than 600 nm. If the volume-average particle diameter of the particulate polymer B is at least 200 nm, the blocking resistance of a battery member provided with the formed adhesive layer can be further improved. If the volume-average particle diameter of the particulate polymer B is no greater than 900 nm, precipitation of solid components (a reduction in the dispersibility of the slurry) in the composition for an adhesive layer containing the particulate polymer B can be inhibited.

The volume-average particle diameter of the particulate polymer B can be adjusted with a similar method to the one described above for the particulate polymer A.

[Degree of Swelling in Electrolysis Solution]

The degree of swelling in electrolysis solution of the particulate polymer B is preferably at least a factor of 6, more preferably at least a factor of 10, and even more preferably at least a factor of 15. If the degree of swelling in electrolysis solution of the particulate polymer B is at least a factor of 6, the ion conductivity increases and a rise in internal resistance can be inhibited in a secondary battery provided with the adhesive layer containing the particulate polymer B. Consequently, the produced secondary battery can be provided with excellent output characteristics.

The degree of swelling in electrolysis solution of the particulate polymer B is not specifically limited, as long as the particulate polymer B does not dissolve in the electrolysis solution, but is normally no greater than a factor of 40 and can, for example, be set to no greater than a factor of 30.

<<Composition>>

The polymer constituting the particulate polymer B is not specifically limited so long as the polymer has the above-described glass-transition temperature and volume-average particle diameter, and any polymer like the polymer constituting the above-described particulate polymer A, for example, can be used.

<<Method for Preparing Particulate Polymer B>>

No specific limitations are placed on the mode of polymerization of the particulate polymer B. For example, any method among solution polymerization, suspension polymerization, bulk polymerization, and emulsion polymerization may be used. As the polymerization reaction, addition polymerization such as ionic polymerization, radical polymerization, or living radical polymerization can be used. The polymerization may be carried out with a commonly used crosslinkable monomer, emulsifier, polymerization initiator, dispersant, chain transfer agent, or the like that are usable for polymerization, and the amount thereof may also be the same as commonly used.

<Additives>

The additives that the presently disclosed composition for an adhesive layer of a non-aqueous secondary battery may optionally include are not specifically limited. Examples include components such as a surface tension modifier, a different dispersant than the dispersant used in the aforementioned polymerization, a viscosity modifier, a reinforcing material, and an additive for electrolysis solution. These components may be commonly known materials such as those described in WO 2012/115096 A1 and are not specifically limited other than being materials that do not affect the battery reaction. One of these components may be used individually, or two or more of these components may be used in combination in a freely selected ratio.

<Method for Preparing Composition for Adhesive Layer of Non-Aqueous Secondary Battery>

The presently disclosed composition for an adhesive layer of a non-aqueous secondary battery is not specifically limited, apart from containing the above-described particulate polymer A and particulate polymer B that have predetermined glass-transition temperatures and volume-average particle diameters, and can be prepared by stirring and mixing the particulate polymer A, the particulate polymer B, and the above-described optional additives in the presence of a dispersion medium. When preparing the composition for an adhesive layer using a dispersion liquid of particulate polymers, the liquid component contained in the dispersion liquid can be used as is as the dispersion medium of the composition for an adhesive layer.

Here, the stirring method is not specifically limited, and a known method may be used. Specifically, the composition for an adhesive layer can be prepared in slurry form by mixing the aforementioned components and dispersion medium using a typical stirring vessel, ball mill, sand mill, bead mill, pigment disperser, ultrasonic disperser, grinding machine, homogenizer, planetary mixer, FILMIX, or the like. Mixing of the aforementioned components and the dispersion medium can normally be performed for a period of 10 minutes to several hours in a temperature range of room temperature to 80° C.

As described above, the particulate polymer A and the particulate polymer B may be polymerized in the composition for an adhesive layer of a non-aqueous secondary battery or may exist separately, but these polymers preferably exist separately. When the particulate polymer A and the particulate polymer B exist separately, they may exist separately without coming into contact at all in the composition for an adhesive layer of a non-aqueous secondary battery, or they may come into contact locally while still existing separately as a whole. The particulate polymer A and the particulate polymer B can achieve their respective functions (such as process adhesiveness and improvement of blocking resistance) better by existing separately. For example, in more detail, the presently disclosed composition for an adhesive layer of a non-aqueous secondary battery is preferably prepared by polymerizing the particulate polymer A and the particulate polymer B individually in different reaction systems and then dispersing the particulate polymer A and the particulate polymer B in a dispersion medium with the above-described optional components.

(Adhesive Layer for Non-Aqueous Secondary Battery)

The presently disclosed adhesive layer for a non-aqueous secondary battery is, for example, formed on a separator and/or an electrode using the composition for an adhesive layer of a non-aqueous secondary battery. In other words, the presently disclosed adhesive layer for a non-aqueous secondary battery contains at least the above-described particulate polymer A and particulate polymer B. By the formed adhesive layer containing the above-described particulate polymer A and particulate polymer B, each battery member including the adhesive layer is provided with good process adhesiveness. Furthermore, because the formed adhesive layer includes the above-described particulate polymer B, which has a larger particle diameter than the particulate polymer A, the battery member including the adhesive layer is provided with good blocking resistance.

To achieve good process adhesiveness, the presently disclosed adhesive layer for a non-aqueous secondary battery is preferably formed on a separator. The presently disclosed adhesive layer for a non-aqueous secondary battery may also be formed on a releasable substrate and then peeled and stacked on (transferred to) a separator, an electrode, or the like.

While the particulate polymer A and the particulate polymer B exist in the composition for an adhesive layer of a non-aqueous secondary battery in particulate form, they may exist in particulate form or in any other form in the formed adhesive layer for a non-aqueous secondary battery.

<Method for Forming Adhesive Layer for Non-Aqueous Secondary Battery>

Examples of methods for forming an adhesive layer for a non-aqueous secondary battery on the above-described substrate, such as a separator, an electrode, or a releasable substrate, include the following.

1) A method for applying the composition for an adhesive layer of a non-aqueous secondary battery on the surface of a substrate and then drying the composition applied on the surface of the substrate; and 2) A method for immersing a substrate into the composition for an adhesive layer of a non-aqueous secondary battery and drying the composition applied to the substrate by immersion.

Of these methods, the method described in 1) is particularly preferable because it allows the thickness of the adhesive layer to be easily controlled. The method described in 1) more specifically includes a step of applying the composition for an adhesive layer onto a separator or an electrode (application step) and a step of drying the composition for an adhesive layer applied on the separator or the electrode to form an adhesive layer (drying step).

The adhesive layer may be formed only on one surface or on both surfaces of the separator or electrode in accordance with the structure of the secondary battery to be produced. For example, when using a separator as the substrate, the adhesive layer is preferably formed on both surfaces of the separator, whereas when using an electrode as the substrate, the adhesive layer is preferably formed on one surface, in particular on the electrode mixed material layer.

<<Application Step>>

No specific limitations are placed on the method by which the composition for an adhesive layer is applied onto the substrate in the application step. Examples of the method include spray coating, doctor blading, reverse roll coating, direct roll coating, gravure coating, extrusion coating, and brush coating.

<<Drying Step>>

In the drying step, the composition for an adhesive layer on the substrate may be dried by any commonly known method, without any specific limitations. Examples of the method include drying by warm, hot, or low-humidity air; vacuum drying; or drying by irradiation with infrared light or electron beams. Although no specific limitations are placed on the drying conditions, the drying temperature is preferably from 30° C. to 80° C., and the drying time is preferably from 30 seconds to 10 minutes.

The thickness of the adhesive layer formed on the substrate is preferably at least 0.01 µm, more preferably at least 0.1 µm, and even more preferably at least 0.5 µm, and is preferably no greater than 10 µm, more preferably no greater than 5 µm, and even more preferably no greater than 1 µm. If the thickness of the adhesive layer is at least the lower limit of the aforementioned range, the adhesive layer can be provided with sufficient strength. If the thickness of the adhesive layer is no greater than the upper limit of the aforementioned range, the ion conductivity of the adhesive layer in the battery can be ensured, and the output characteristics and the like of the secondary battery provided with the adhesive layer can be further improved.

(Adhesive Layer-Equipped Separator for Non-Aqueous Secondary Battery)

The presently disclosed adhesive layer-equipped separator for a non-aqueous secondary battery has the adhesive layer for a non-aqueous secondary battery formed as described above on a separator. In other words, the presently disclosed adhesive layer-equipped separator for a non-aqueous secondary battery includes an adhesive layer containing the above-described particulate polymer A and particulate polymer B on at least one surface of a separator. In the adhesive layer-equipped separator for a non-aqueous secondary battery, the adhesive layer formed on one or both surfaces of the separator contains the above-described particulate polymer A and particulate polymer B and thus adheres well to the separator. The adhesive layer formed on one or both surfaces of the separator can adhere the adhesive layer-equipped separator and an electrode together well during production of a secondary battery. In other words, the formed adhesive layer allows the adhesive layer-equipped separator to achieve good process adhesiveness. Furthermore, because the formed adhesive layer includes the above-described particulate polymer B, which has a larger particle diameter than the particulate polymer A, the adhesive layer-equipped separator has good blocking resistance.

Here, the separator provided with the adhesive layer is not specifically limited. Examples of the separator include a separator constituted by an organic separator substrate and a separator obtained by forming a porous membrane that includes non-conductive particles and a binder on an organic separator substrate. The organic separator substrate is a porous member composed of organic material and is not specifically limited. For example, the organic separator substrate disclosed in JP 2012-204303 A may be used. Of these separators, a fine porous membrane made of polyolefinic (i.e., polyethylene, polypropylene, polybutene, or polyvinyl chloride) resin is preferred because such a membrane can reduce the total thickness of the separator, such as an organic separator substrate, thereby increasing the ratio of electrode active material in a secondary battery and consequently increasing the capacity per volume.

<Method for Forming Adhesive Layer-Equipped Separator for Non-Aqueous Secondary Battery>

The method for forming an adhesive layer-equipped separator for a non-aqueous secondary battery is not specifically limited. Examples include a method similar to the above-described method for forming an adhesive layer for a non-aqueous secondary battery. An example of a preferred formation method is the above-described method of 1).

(Adhesive Layer-Equipped Electrode for Non-Aqueous Secondary Battery)

The presently disclosed adhesive layer-equipped electrode for a non-aqueous secondary battery has the adhesive layer for a non-aqueous secondary battery formed as described above on an electrode (positive electrode or negative electrode). In other words, the presently disclosed adhesive layer-equipped electrode for a non-aqueous secondary battery includes an adhesive layer containing the above-described particulate polymer A and particulate polymer B on at least one surface of an electrode. In the adhesive layer-equipped electrode for a non-aqueous secondary battery, the adhesive layer formed on one or both sides of the electrode contains the above-described particulate polymer A and particulate polymer B and thus adheres well to the electrode. The adhesive layer formed on one or both surfaces of the electrode can adhere the adhesive layer-equipped electrode and a separator together well during production of a secondary battery. In other words, the formed adhesive layer allows the adhesive layer-equipped electrode to achieve good process adhesiveness. Furthermore, because the formed adhesive layer includes the above-described particulate polymer B, which has a larger particle diameter than the particulate polymer A, the adhesive layer-equipped electrode has good blocking resistance.

Here, as the electrode including the adhesive layer, an electrode with an electrode mixed material layer formed on a current collector is normally used. The electrode may further have a porous membrane (a reinforcing layer, a heat resistant layer, or the like) that includes non-conductive particles and a binder on the electrode mixed material layer.

The current collector may be made of a metal material such as iron, copper, aluminum, nickel, stainless steel, titanium, tantalum, gold, or platinum. Of these metal materials, the current collector for a negative electrode is preferably made of copper. The current collector for a positive electrode is preferably made of aluminum.

The electrode mixed material layer may be a layer containing an electrode active material and a binder (binder for electrode mixed material layer). For example, the electrode mixed material layer may be, but is not specifically limited to, the electrode mixed material layer disclosed in JP 2013-145763 A.

Furthermore, a known method may be used for forming the electrode mixed material layer on the current collector.

<Method for Forming Adhesive Layer-Equipped Electrode for Non-Aqueous Secondary Battery>

The method for forming an adhesive layer-equipped electrode for a non-aqueous secondary battery is not specifically limited. Examples include a method similar to the above-described method for forming an adhesive layer for a non-aqueous secondary battery. An example of a preferred formation method is the above-described method of 1).

(Non-Aqueous Secondary Battery)

The presently disclosed non-aqueous secondary battery includes electrodes (positive electrode, negative electrode), a separator, and the above-described adhesive layer for a non-aqueous secondary battery between the positive electrode and the separator and/or between the negative electrode and the separator. Normally, the electrodes, separator, and adhesive layer function as a battery in a state of immersion in electrolysis solution. In other words, the above-described adhesive layer-equipped electrodes for a non-aqueous secondary battery and the separator may be arranged with the adhesive layer for a non-aqueous secondary battery therebetween, or the above-described adhesive layer-equipped separator for a non-aqueous secondary battery and the electrodes may be arranged with the adhesive layer for a non-aqueous secondary battery therebetween. An independently formed adhesive layer for a non-aqueous secondary battery may also be provided between the electrodes and the separator. Among these configurations, arranging the adhesive layer-equipped separator for a non-aqueous secondary battery and the electrodes so that the adhesive layer for a non-aqueous secondary battery is therebetween is preferable for achieving high adhesiveness and ease of production. Because the presently disclosed non-aqueous secondary battery includes the presently disclosed adhesive layer for a non-aqueous secondary battery between the electrodes and the separator, the secondary battery can achieve excellent output characteristics (in particular, low-temperature output characteristics) as a result of having high ion conductivity and low battery resistance inside the battery.

The electrodes that do not have an adhesive layer and the separator that does not have an adhesive layer are not specifically limited, and an electrode and separator such as those before adhesive layer formation in the above sections "adhesive layer-equipped electrode for non-aqueous secondary battery" and "adhesive layer-equipped separator for non-aqueous secondary battery" may be used for each. Known electrolysis solutions used in non-aqueous secondary batteries can be used as the electrolysis solution.

<Electrolysis Solution>

As the electrolysis solution, an organic electrolysis solution obtained by dissolving a supporting electrolyte into an organic solvent is normally used. For example, when the non-aqueous secondary battery is a lithium ion secondary battery, a lithium salt is used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in that they easily dissolve in solvent and exhibit a high degree of dissociation, with $LiPF_6$ being particularly preferable. Electrolytes may be used alone or in combination at any ratio. Normally, lithium ion conductivity tends to increase as a supporting electrolyte with a higher degree of dissociation is used. Therefore, lithium ion conductivity can be adjusted by the type of supporting electrolyte.

Any organic solvent that can dissolve the supporting electrolyte can be used as the organic solvent in the electrolysis solution. Preferred examples include carbonates such as dimethyl carbonate (DMC), ethylene carbonate (EC), diethyl carbonate (DEC), propylene carbonate (PC), butylene carbonate (BC), and ethylmethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Of these solvents, carbonates are preferable for their high dielectric constant and broad stable potential region, and a mixture of ethylene carbonate and ethylmethyl carbonate is more preferable.

Moreover, a known additive such as vinylene carbonate (VC), fluoroethylene carbonate (FEC), or ethyl methyl sulfone may be added to the electrolysis solution.

(Method for Producing Non-Aqueous Secondary Battery)

The presently disclosed method for producing a non-aqueous secondary battery includes a step of forming an adhesive layer for a non-aqueous secondary battery on at least one of an electrode (positive electrode, negative electrode) and a separator using the above-described composition for an adhesive layer of a non-aqueous secondary battery (adhesive layer formation step). The presently disclosed method for producing a non-aqueous secondary battery may also include a step of adhering the electrode (positive electrode, negative electrode) and the separator via the adhesive layer for a non-aqueous secondary battery (adhesion step) and a step of assembling the battery. Because the presently disclosed method for preparing a non-aqueous secondary battery includes the step of forming the adhesive layer for a non-aqueous secondary battery, non-aqueous secondary batteries can be produced with good productivity while providing the battery members with good blocking resistance and process adhesiveness.

<Adhesive Layer Formation Step>

In the adhesive layer formation step, an adhesive layer is formed on at least one of the positive electrode, the negative electrode, and the separator using the above-described composition for an adhesive layer of a non-aqueous secondary battery. This adhesive layer formation step is not specifically limited and may, for example, be performed using a similar method to the above-described method for forming the adhesive layer for a non-aqueous secondary battery. For ease of coating the composition for an adhesive layer of a non-aqueous secondary battery, the adhesive layer is preferably formed on at least the separator.

<Adhesion Step>

In the adhesion step, the positive electrode and the separator and/or the negative electrode and the separator are adhered via the above-described adhesive layer for a non-aqueous secondary battery, with the positive electrode and the separator and also the negative electrode and the separator preferably being adhered. A laminate having the electrodes, the separator, and an adhesive layer between the electrodes and the separator is thus obtained. The adhesion temperature during the adhesion step is not specifically limited, but using the glass-transition temperature ($Tg_B$) of the particulate polymer B as a standard, the adhesion temperature is preferably at least −20° C., more preferably at least −10° C., and even more preferably at least −5° C., and is preferably no higher than +35° C., more preferably no higher than +30° C., and even more preferably no higher than +20° C. By adhering the electrodes and the separator at a temperature that is at least the $Tg_B$ of −20° C., the particulate polymer B can achieve better adhesiveness, and good process adhesiveness can be obtained. By adhering the electrodes and the separator at a temperature that is no higher than the $Tg_B$ of +35° C., the adhesion step can be performed while preventing the gaps in the adhesive layer from being filled by particulate polymer or the like due to excessive softening of the particulate polymer B, and good low-temperature output characteristics can be obtained in the produced secondary battery.

The adhesion itself is not specifically limited and may be carried out by, for example, applying any level of pressure to a laminate including electrodes, a separator, and an adhesive layer between the electrodes and the separator. The application of pressure is not specifically limited and can be performed using a pressure device such as a role press or a flat plate press. The pressure may, for example, be from 0.1 MPa to 10 MPa. The adhesion step may be performed only once or may be performed two or more times.

<Assembly Step>

The presently disclosed method for producing a non-aqueous secondary battery is not particularly limited apart from inclusion of the above-described adhesive layer formation step and allows production of a non-aqueous secondary battery using a known assembly method. Specifically, the presently disclosed method for producing a non-aqueous secondary battery allows production of a non-aqueous secondary battery by stacking electrodes (positive electrode, negative electrode), a separator, and an adhesive layer between the positive electrode and the separator and/or between the negative electrode and the separator into a laminate, winding or folding the laminate as necessary into a battery shape, placing the laminate in a battery container, filling the battery container with an electrolysis solution, and sealing the container. In order to prevent increased internal pressure of the non-aqueous secondary battery, the occurrence of overcharging or overdischarging, or the like, an overcurrent preventing device, such as a fuse or a PTC device; an expanded metal; or a lead plate may be provided as necessary. The secondary battery may be of any shape, such as a coin, button, sheet, cylindrical, square, or flat shape.

EXAMPLES

Hereinafter, the present disclosure will be specifically described with reference to Examples; however, the disclosure is not limited to the Examples. In the following, "%" and "parts" used in expressing quantities are by mass, unless otherwise specified.

In the Examples and the Comparative Examples, the glass-transition temperature, volume-average particle diameter, and degree of swelling in electrolysis solution of the particulate polymers; the blocking resistance of an adhesive layer-equipped separator or an adhesive layer-equipped positive electrode; the adhesiveness of the substrate and the adhesive layer; the process adhesiveness between the electrodes and the separator via the adhesive layer; and the low-temperature output characteristics of the secondary battery were measured and evaluated by the following methods.

<Glass-Transition Temperature (Tg)>

The glass-transition temperature ($Tg_A$) of the particulate polymer A and the glass-transition temperature ($Tg_B$) of the particulate polymer B were measured using a differential scanning calorimeter (produced by SII Technology, product name: EXSTAR DSC6220). Specifically, 10 mg of the prepared particulate polymer was placed in an aluminum pan for each sample. An empty aluminum pan was used as a reference material. The sample was placed in the aforementioned differential scanning calorimeter and measured in a temperature range from −100° C. to 200° C. (heating rate of 10° C./min) to obtain a differential scanning calorimetry (DSC) curve. The temperature corresponding to the intersection, in the DSC curve, between the baseline immediately before an endothermic peak at which a differential signal (DDSC) reached at least 0.05 mW/min/mg and a tangent to the inflection point first appearing after the endothermic peak was calculated as the glass-transition temperature (° C.). The results are listed in Table 1.

<Volume-Average Particle Diameter>

The volume-average particle diameter ($D_A$) of the particulate polymer A and the volume-average particle diameter ($D_B$) of the particulate polymer B were measured by a laser diffraction method. Specifically, an aqueous dispersion solution (adjusted to a solid content concentration of 0.1 mass %) including the prepared particulate polymer was used as a sample. In a (volume-based) particle diameter distribution measured using a laser diffraction particle size analyzer (produced by Beckman Coulter, Inc., product name: LS-230), the particle diameter D50 at which the cumulative volume calculated from the small diameter end reached 50% was taken to be the volume-average particle diameter (μm). The results are listed in Table 1.

<Degree of Swelling in Electrolysis Solution>

The degree of swelling in electrolysis solution of the particulate polymers was measured by the following method. Specifically, water dispersions containing the particulate polymers were placed in a polytetrafluoroethylene petri dish. Each water dispersion in a petri dish was dried at a temperature of 25° C. for 48 hours to obtain powdered samples. Approximately 0.2 g of each sample was pressed for 2 minutes at a temperature of 200° C. and a pressure of 5 MPa to obtain a test specimen. The measured weight of the resulting test specimen was recorded as W0.

Next, the resulting test specimen was immersed in electrolysis solution at a temperature of 60° C. for 72 hours. A solution containing $LiPF_6$ at a concentration of 1 M as a supporting electrolyte in a mixed solvent of ethylene carbonate (EC), diethyl carbonate (DEC), and vinylene carbonate (VC) (EC/DEC/VC=68.5/30/1.5 by volume) was used as the electrolysis solution.

After immersion, the test specimen was removed from the electrolysis solution, and the electrolysis solution on the surface of the test specimen was wiped off. The measured weight of the test specimen after immersion was recorded as W1.

Using the measured weights W0 and W1, the degree (factor) of swelling S in electrolysis solution was calculated as S=W1/W0. The results are listed in Table 1.

<Blocking Resistance>

The blocking resistance of an adhesive layer-equipped separator for a non-aqueous secondary battery and an adhesive layer-equipped positive electrode for a non-aqueous secondary battery was evaluated as follows. Specifically, the produced adhesive layer-equipped separator for a non-aqueous secondary battery and adhesive layer-equipped positive electrode for a non-aqueous secondary battery were each cut into square pieces measuring 5 cm wide by 5 cm high. Two square pieces were overlapped so that the adhesive layer surfaces of the adhesive layer-equipped separators and of the adhesive layer-equipped positive electrodes faced each other. The overlapped adhesive layer-equipped separators and the overlapped adhesive layer-equipped positive electrodes were placed under a pressure of 10 g/cm² at 40° C. to obtain pressed test specimens. The resulting pressed test specimens were each left standing for 24 hours. For each test specimen that had been left standing for 24 hours, one square piece of the overlapped separators or positive electrodes was fixed, the other square piece was pulled with a force of 0.3 N/m, and the test specimen was observed to see whether peeling was possible. The adhesion state (blocking state) was evaluated with the following criteria. Less observation of the adhesion state indicates better blocking resistance. The results are listed in Table 1.

A: The square pieces are not adhered.
B: The square pieces are adhered but can be peeled apart.
C: The square pieces are adhered and cannot be peeled apart.

<Adhesiveness Between Substrate and Adhesive Layer>

The adhesiveness between the substrate (separator or positive electrode) and the adhesive layer was measured and evaluated as the peel strength as follows. Specifically, test specimens were obtained by cutting each produced adhesive layer-equipped separator for a non-aqueous secondary battery or adhesive layer-equipped positive electrode for a non-aqueous secondary battery into a rectangle measuring 100 mm long by 10 mm wide. The test specimens were placed with the surface of the adhesive layer facing down, and cellophane tape (prescribed by JIS Z1522) was attached to the surface of the adhesive layer. The cellophane tape had been affixed to a horizontal test stage. The stress at the time when the substrate (separator or positive electrode) was peeled by pulling up one end in the vertical direction at a pulling speed of 50 mm/min was measured. This measurement was made three times, and the average measured stress was calculated and taken to be the peel strength (N/m). Using the measured peel strength, the adhesiveness was evaluated by the following criteria. A greater peel strength indicates better adhesiveness between the substrate and the adhesive layer. The results are listed in Table 1.

A: Peel strength of at least 70 N/m
B: Peel strength of at least 40 N/m and less than 70 N/m
C: Peel strength of less than 40 N/m, or dusting of the adhesive layer (detachment of adhesive particles)

<Process Adhesiveness>

Examples 1 to 11 and Comparative Examples 1 to 3

The process adhesiveness between the electrode (positive electrode) and the separator via the adhesive layer for a non-aqueous secondary battery was measured and evaluated as the peel strength as follows. In this measurement, the positive electrode serving as the electrode and the separator were placed opposite each other as an example, but measurements can be made by the same method when placing the negative electrode and the separator opposite each other. Specifically, the produced positive electrode and adhesive layer-equipped separator for a non-aqueous secondary battery were each cut to measure 50 mm long by 10 mm wide. The cut positive electrode and adhesive layer-equipped separator were stacked with the adhesive layer therebetween. The resulting stacked piece was pressed by a roll press at a process adhesion temperature (T) of 60° C. and a load of 10 kN/m to adhere the positive electrode and the separator, thus obtaining a test specimen.

The test specimen was placed with the surface of the positive electrode on the current collector side facing down, and cellophane tape (prescribed by JIS Z1522) was attached to the surface of the positive electrode on the current collector side. The cellophane tape had been affixed on a horizontal test stage. The stress at the time when the adhesive layer-equipped separator was peeled by pulling up one end in the vertical direction at a pulling speed of 50 mm/min was measured. This measurement was made a total of 3 times. The average measured stress was calculated as the peel strength (N/m), which was evaluated by the following criteria as the process adhesiveness between the positive electrode and the separator via the adhesive layer. A higher peel strength indicates better process adhesiveness. The results are listed in Table 1.

Example 12

The produced adhesive layer-equipped positive electrode for a non-aqueous secondary battery and the separator were each cut to measure 50 mm long by 10 mm wide. The cut adhesive layer-equipped positive electrode for a non-aqueous secondary battery and separator without an adhesive layer were then stacked with an adhesive layer therebetween. The resulting stacked piece was pressed by a roll press at a press adhesion temperature (T) of 60° C. and a load of 10 kN/m to adhere the positive electrode and the separator, thus obtaining a test specimen.

The test specimen was placed with the surface of the positive electrode on the current collector side facing down, and cellophane tape (prescribed by JIS Z1522) was attached to the surface of the positive electrode on the current collector side. The cellophane tape had been affixed on a horizontal test stage. The stress at the time when the separator was peeled by pulling up one end in the vertical direction at a pulling speed of 50 mm/min was then measured. This measurement was made a total of 3 times. The average measured stress was calculated as the peel strength (N/m), which was evaluated by the following criteria as the process adhesiveness between the positive electrode and the separator via the adhesive layer. A higher peel strength indicates better process adhesiveness. The results are listed in Table 1.

Example 13

The resulting stacked piece was pressed by a roll press at a process adhesion temperature (T) of 30° C. and a load of 10 kN/m to adhere the positive electrode and the separator, thus obtaining a test specimen.

Apart from this point, the test specimen was obtained with a similar method to Example 1, and the process adhesiveness was evaluated in a similar way to Example 1 with the following criteria. A higher peel strength indicates better process adhesiveness. The results are listed in Table 1.

Example 14

The resulting stacked piece was pressed by a roll press at a process adhesion temperature (T) of 80° C. and a load of 10 kN/m to adhere the positive electrode and the separator, thus obtaining a test specimen.

Apart from this point, the test specimen was obtained with a similar method to Example 1, and the process adhesiveness was evaluated in a similar way to Example 1 with the following criteria. A higher peel strength indicates better process adhesiveness. The results are listed in Table 1.

A: Peel strength of at least 30 N/m
B: Peel strength of at least 15 N/m and less than 30 N/m
C: Peel strength of at least 0.5 N/m and less than 15 N/m
D: Peel strength of less than 0.5 N/m <Low-Temperature Output Characteristics of Non-Aqueous Secondary Battery>

A lithium ion secondary battery as a produced non-aqueous secondary battery (a 40 mAh stacked laminate cell) was allowed to stand for 24 hours in a 25° C. environment. The lithium ion secondary battery was then charged for 5 hours at a charging rate of 0.1 C in a 25° C. environment, and a voltage measured after charging was recorded as V0. Next, the lithium ion secondary battery was discharged at a discharge rate of 1 C in a −10° C. environment, and a voltage measured 15 seconds after the initiation of discharge was recorded as V1.

The voltage change ΔV (defined as V0−V1) was then calculated, and the low-temperature output characteristics of the secondary battery were evaluated based on the criteria below. A smaller value for the voltage change ΔV indicates better low-temperature output characteristics. The results are listed in Table 1.

A: Voltage change ΔV of less than 350 mV
B: Voltage change ΔV of at least 350 mV and less than 500 mV
C: Voltage change ΔV of at least 500 mV Example 1

<Preparation of Particulate Polymer A>

A reaction vessel equipped with a stirrer was charged with 70 parts of deionized water, 0.15 parts of sodium lauryl sulfate (produced by Kao Corporation, product name: EMAL 2F) as an emulsifier, and 0.5 parts of ammonium persulfate as a polymerization initiator. The gas phase of the reaction vessel was purged with nitrogen gas, and the contents of the reaction vessel were heated to 60° C.

A monomer mixture was prepared in a separate vessel by mixing 50 parts of deionized water, 0.5 parts of sodium dodecylbenzenesulfonate as a dispersant, 94 parts of butyl acrylate, 2 parts of acrylonitrile, 2 parts of methacrylic acid, 1 part of N-methylolacrylamide, and 1 part of allyl glycidyl ether. The monomer mixture was continuously added to the reaction vessel over 4 hours to effect polymerization. During addition, the polymerization reaction was effected while maintaining the temperature at 60° C. After completion of addition, the reaction mass was further stirred for 3 hours at 70° C. and the polymerization reaction was quenched, yielding a water dispersion of the particulate polymer A, which is an acrylic-based polymer.

The glass-transition temperature, volume-average particle diameter, and degree of swelling in electrolysis solution of the obtained particulate polymer A were measured. The obtained particulate polymer A had a glass-transition temperature of −37° C., a volume-average particle diameter D50 of 380 nm, and a degree of swelling in electrolysis solution of a factor of 4.0.

<Preparation of Particulate Polymer B>

A mixture was obtained by charging a 5 MPa pressure vessel equipped with a stirrer with 55 parts of methyl methacrylate, 40 parts of butyl acrylate, 4 parts of methacrylic acid, 1 part of ethylene dimethacrylate, 1 part of sodium dodecylbenzenesulfonate as an emulsifier, 150 parts of deionized water, and 0.5 parts of potassium persulfate as a polymerization initiator. After the mixture was fully stirred, the temperature was raised to 60° C. to initiate polymerization. When the polymerization conversion rate reached 98%, the polymerization reaction was quenched by cooling to produce a water dispersion of the particulate polymer B, which is an acrylic-based polymer.

The glass-transition temperature, volume-average particle diameter, and degree of swelling in electrolysis solution of the obtained particulate polymer B were measured. The obtained particulate polymer B had a glass-transition temperature of 47° C., a volume-average particle diameter D50 of 500 nm, and a degree of swelling in electrolysis solution of a factor of 18.

<Production of Composition for Adhesive Layer of Non-Aqueous Secondary Battery>

In a stirring vessel, 50 parts by mass in terms of solid content of the particulate polymer A and 100 parts by mass in terms of solid content of the particulate polymer B obtained as described above were mixed.

Then, 1 part by mass of a surface tension modifier (produced by SAN NOPCO Ltd., product name: SN366) and 1 part of ammonium polyacrylate (produced by Toagosei Co., Ltd., product name: A6114) as a dispersant were added to the stirring vessel. Furthermore, the mixture was diluted with deionized water to obtain a composition for an adhesive layer of a non-aqueous secondary battery in slurry form with a 30% solid content concentration.

<Production of Adhesive Layer-Equipped Separator for Non-Aqueous Secondary Battery>

A polypropylene separator (produced by Celgard, LLC., product name "Celgard 2500") was prepared. The composition for an adhesive layer of a non-aqueous secondary battery obtained as described above was applied to the surface of the prepared separator using a bar coater and then dried in an oven for 3 minutes at a temperature of 50° C. The same process was performed on the other surface of the separator to obtain an adhesive layer-equipped separator for a non-aqueous secondary battery with an adhesive layer formed on both surfaces (thickness of each adhesive layer: 1 μm).

The blocking resistance of the obtained adhesive layer-equipped separator for a non-aqueous secondary battery and the adhesiveness between the separator and the adhesive layer were measured and evaluated by the aforementioned methods. The results are listed in Table 1.

<Production of Electrode for Non-Aqueous Secondary Battery>

<<Negative Electrode>>

[Preparation of Binder]

A 5 MPa pressure vessel equipped with a stirrer was charged with 33 parts of 1,3-butadiene, 3.5 parts of itaconic acid, and 63.5 parts of styrene as monomers, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was quenched by cooling at the point at which the polymerization conversion rate reached 96% to yield a mixture that contained a particulate binder (styrene-butadiene copolymer). The mixture was adjusted to pH 8 through addition of a 5% sodium hydroxide aqueous solution, and unreacted monomers were then removed by thermal-vacuum distillation. Thereafter, the mixture was cooled to 30° C. or lower to obtain a water dispersion containing a binder.

<Preparation of Slurry Composition for Negative Electrode>

A mixture containing 100 parts of synthetic graphite (average particle diameter: 15.6 μm) and 1 part in terms of solid content of a 2% aqueous solution of sodium salt of carboxymethyl cellulose (produced by Nippon Paper Industries Co., Ltd., product name: MAC350HC) as a thickener was adjusted to a solid content concentration of 68% with deionized water and was then mixed for 60 minutes at 25° C. The solid content concentration was then adjusted to 62% with deionized water, after which the mixture was further mixed for 15 minutes at 25° C. to obtain a mixed solution. Next, 1.5 parts in terms of solid content of the water dispersion containing the above-described binder and deionized water were added to the obtained mixed solution, which was adjusted to a final solid content concentration of 52% and was then further mixed for 10 minutes. The mixed solution was subjected to a defoaming process under reduced pressure to yield a highly fluid slurry composition for a negative electrode.

[Production of Negative Electrode]

The slurry composition for a negative electrode obtained as described above was applied using a comma coater onto one surface of a copper foil (thickness: 20 μm) as a current collector so that the dry film thickness would be approximately 150 μm. The slurry composition was then dried. This drying was performed by transporting the copper foil with the slurry composition applied thereon through an oven at 60° C. at a rate of 0.5 m/min over 2 minutes. Subsequently, the copper foil was heat-treated for 2 minutes at 120° C. to obtain a pre-press web of negative electrode. The pre-press web of negative electrode was rolled with a roll press to yield a post-press negative electrode (thickness of negative electrode mixed material layer: 80 μm).

<<Positive Electrode>>

[Preparation of Slurry Composition for Positive Electrode]

A mixture of 100 parts of $LiCoO_2$ (volume-average particle diameter: 12 μm) as a positive electrode active material, 2 parts of acetylene black (produced by Denki Kagaku Kogyo Kabushiki Kaisha, product name: HS-100) as a conductive material, and 2 parts in terms of solid content of polyvinylidene fluoride (produced by Kureha Corporation, product name: #7208) as a binder was mixed with N-methylpyrrolidone as a solvent to yield a mixed solution with a total solid content concentration adjusted to 70%. The obtained mixed solution was mixed using a planetary mixer to yield a slurry composition for a positive electrode.

[Production of Positive Electrode]

The slurry composition for a positive electrode obtained as described above was applied using a comma coater onto one surface of an aluminum foil (thickness: 20 μm) as a current collector so that the dry film thickness would be approximately 150 μm. The slurry composition was then dried. This drying was performed by transporting the aluminum foil through an oven at 60° C. at a rate of 0.5 m/min over 2 minutes. Subsequently, the aluminum foil was heat-treated for 2 minutes at 120° C. to obtain a pre-press web of positive electrode. The pre-press web of positive electrode was rolled with a roll press to yield a post-press positive electrode (thickness of positive electrode mixed material layer: 80 μm).

A test specimen was produced as described above using the obtained positive electrode and the adhesive layer-equipped separator for a non-aqueous secondary battery, and the process adhesiveness of the adhesive layer in the test specimen was measured and evaluated by the aforementioned method. The results are listed in Table 1.

<Production of Non-Aqueous Secondary Battery>

The post-press positive electrode obtained as described above was cut into a 4 cm×4 cm square. The adhesive layer-equipped separator for a non-aqueous secondary battery obtained as described above was then cut to 5 cm×5 cm and arranged on the surface of the positive electrode mixed material layer of the positive electrode. Furthermore, the post-press negative electrode produced as described above was cut to 4.2 cm×4.2 cm and arranged on the surface of the adhesive layer-equipped separator for a non-aqueous secondary battery not in contact with the positive electrode mixed material layer, with the surface of the negative electrode mixed material layer facing the separator. A laminate was thus obtained. The adhesive layer-equipped separator for a non-aqueous secondary battery was formed to have an adhesive layer on both surfaces of the separator. Next, the obtained laminate was pressed at a temperature of 60° C. and a pressure of 0.5 MPa to obtain a laminate in which the positive electrode, separator, and negative electrode were adhered via adhesive layers.

Subsequently, the adhered laminate was enclosed by an aluminum packing case as a battery outer package. Electrolysis solution (solvent: ethylene carbonate (EC)/diethyl carbonate (DEC)/vinylene carbonate (VC)=68.5/30/1.5 by volume, electrolyte: LiPF$_6$ at a concentration of 1 M) was injected so that no air remained. The opening of the aluminum packing case was then heat sealed at 150° C., hermetically sealing the aluminum packing case. Finally, the aluminum packing case portion containing the adhered laminate was pressed at 60° C. and 0.5 MPa to produce a lithium ion secondary battery that was a 40 mAh stacked laminate cell.

The low-temperature output characteristics of the produced lithium ion secondary battery were then evaluated. The results are listed in Table 1.

Example 2

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the preparation of the particulate polymer B, the methyl methacrylate was changed to 50 parts and the butyl acrylate was changed to 45 parts, and the resulting particulate polymer B had a glass-transition temperature of 35° C., a degree of swelling in electrolysis solution of a factor of 20, and a volume-average particle diameter of 450 nm.

The measurements and evaluations were then performed in the same manner as for Example 1. The results are listed in Table 1.

Example 3

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the preparation of the particulate polymer B, the methyl methacrylate was changed to 58 parts and the butyl acrylate was changed to 37 parts, and the resulting particulate polymer B had a glass-transition temperature of 58° C., a degree of swelling in electrolysis solution of a factor of 17, and a volume-average particle diameter of 530 nm.

The measurements and evaluations were then performed in the same manner as for Example 1. The results are listed in Table 1.

Example 4

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the preparation of the particulate polymer A, the butyl acrylate was changed to 74 parts and 20 parts of 2-ethylhexyl acrylate (2-EHA) was added, and the resulting particulate polymer A had a glass-transition temperature of −48° C., a degree of swelling in electrolysis solution of a factor of 3.5, and a volume-average particle diameter of 400 nm.

The measurements and evaluations were then performed in the same manner as for Example 1. The results are listed in Table 1.

Example 5

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that as the particulate polymer A, the conjugated diene-based polymer prepared by the following method was used instead of an acrylic-based polymer.

The measurements and evaluations were then performed in the same manner as for Example 1. The results are listed in Table 1.

<Preparation of Particulate Polymer A>

A 5 MPa pressure vessel equipped with a stirrer was charged with 42 parts of styrene, 34 parts of 1,3-butadiene, 20 parts of acrylonitrile, 4 parts of itaconic acid, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was quenched by cooling at the point at which the polymerization conversion rate reached 96% to yield a mixture that contained a styrene-butadiene copolymer as the particulate polymer A. The mixture was adjusted to pH 8 through addition of a 5% sodium hydroxide aqueous solution, and unreacted monomers were then removed by thermal-vacuum distillation. Thereafter, the mixture was cooled to 30° C. or lower to obtain a water dispersion containing the particulate polymer A.

The obtained particulate polymer A had a glass-transition temperature of 13° C., a degree of swelling in electrolysis solution of a factor of 3.2, and a volume-average particle diameter of 220 nm.

Example 6

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the production of the composition for an adhesive layer of a non-aqueous secondary battery, the amount of the particulate polymer A was changed to 15 parts in terms of solid content.

The measurements and evaluations were then performed in the same manner as for Example 1. The results are listed in Table 1.

Example 7

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the production of the composition for an adhesive layer of a non-aqueous secondary battery, the amount of the particulate polymer A was changed to 25 parts in terms of solid content.

The measurements and evaluations were then performed in the same manner as for Example 1. The results are listed in Table 1.

Example 8

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the production of the composition for an adhesive layer of a non-aqueous secondary battery, the amount of the particulate polymer A was changed to 65 parts in terms of solid content.

The measurements and evaluations were then performed in the same manner as for Example 1. The results are listed in Table 1.

Example 9

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the production of the composition for an adhesive layer of a non-aqueous secondary battery, the amount of the particulate polymer A was changed to 75 parts in terms of solid content.

The measurements and evaluations were then performed in the same manner as for Example 1. The results are listed in Table 1.

Example 10

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the preparation of the particulate polymer B, the methyl methacrylate was changed to 35 parts and 20 parts of styrene was added, and the resulting particulate polymer B had a glass-transition temperature of 46° C., a degree of swelling in electrolysis solution of a factor of 8.0, and a volume-average particle diameter of 470 nm.

The measurements and evaluations were then performed in the same manner as for Example 1. The results are listed in Table 1.

Example 11

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 5 except that in the preparation of the particulate polymer A, the styrene was changed to 52 parts, the 1,3-butadiene to 33 parts, and the acrylonitrile to 10 parts, and 1 part of 2-hydroxyethylacrylate (β-HEA) was added.

The obtained particulate polymer A had a glass-transition temperature of 10° C., a degree of swelling in electrolysis solution of a factor of 2.0, and a volume-average particle diameter of 200 nm.

The measurements and evaluations were then performed in the same manner as for Example 1. The results are listed in Table 1.

Example 12

Instead of an adhesive layer-equipped separator for a non-aqueous secondary battery, a separator without an adhesive layer was used. Instead of a positive electrode without an adhesive layer, an adhesive layer-equipped positive electrode for a non-aqueous secondary battery produced with the following method was used. The particulate polymer A, particulate polymer B, composition for an adhesive layer of a non-aqueous secondary battery, electrode for a non-aqueous secondary battery, adhesive layer-equipped positive electrode for a non-aqueous secondary battery, and non-aqueous secondary battery were produced in a way similar to Example 1 with the further exception that the non-aqueous secondary battery was produced by the following method.

The glass-transition temperature, volume-average particle diameter, degree of swelling in electrolysis solution, and low-temperature output characteristics of the secondary battery were then measured and evaluated in the same manner as for Example 1. The blocking resistance of the adhesive layer-equipped positive electrode for a non-aqueous secondary battery, the adhesiveness between the positive electrode and the adhesive layer, and the process adhesiveness were measured and evaluated in accordance with the above-described methods. The results are listed in Table 1.

<Production of Adhesive Layer-Equipped Positive Electrode for Non-Aqueous Secondary Battery>

A post-press positive electrode obtained as described above was prepared. The composition for an adhesive layer of a non-aqueous secondary battery obtained as described above was applied to the surface of the prepared positive electrode on the positive electrode mixed material layer side using a bar coater and then dried in an oven for 3 minutes at a temperature of 50° C. An adhesive layer-equipped positive electrode for a non-aqueous secondary battery with an adhesive layer formed on one surface (single-surface thickness of adhesive layer: 1 μm) was thus obtained.

<Production of Non-Aqueous Secondary Battery>

The adhesive layer-equipped positive electrode for a non-aqueous secondary battery obtained as described above was cut into a 4 cm×4 cm square. A separator not having an adhesive layer was then cut to 5 cm×5 cm and arranged on the surface of the adhesive layer on the positive electrode mixed material layer of the positive electrode. Furthermore, the post-press negative electrode produced as described above was cut to 4.2 cm×4.2 cm and arranged on the surface of the adhesive layer-equipped separator for a non-aqueous secondary battery not in contact with the positive electrode mixed material layer, with the surface of the negative electrode mixed material layer facing the separator. A laminate was thus obtained. Next, the obtained laminate was pressed at a temperature of 60° C. and a pressure of 0.5 MPa to obtain a laminate in which the positive electrode and separator were adhered via an adhesive layer.

Subsequently, the adhered laminate was enclosed by an aluminum packing case as a battery outer package. Electrolysis solution (solvent: ethylene carbonate (EC)/diethyl carbonate (DEC)/vinylene carbonate (VC)=68.5/30/1.5 by volume, electrolyte: $LiPF_6$ at a concentration of 1 M) was injected so that no air remained. The opening of the aluminum packing case was then heat sealed at 150° C., hermetically sealing the aluminum packing case. Finally, the aluminum packing case portion containing the adhered laminate was pressed at 60° C. and 0.5 MPa to produce a lithium ion secondary battery that was a 40 mAh stacked laminate cell.

Example 13

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the production of the non-aqueous secondary battery, the obtained laminate was a laminate adhered by pressing at a temperature of 30° C. and 0.5 MPa.

The measurements and evaluations were then performed in the same manner as for Example 1. The results are listed in Table 1.

Example 14

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the production of the non-aqueous secondary battery, the obtained laminate was a laminate adhered by pressing at a temperature of 80° C. and 0.5 MPa.

The measurements and evaluations were then performed in the same manner as for Example 1. The results are listed in Table 1.

Comparative Example 1

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the preparation of the particulate polymer B, the methyl methacrylate was changed to 95 parts and no butyl acrylate was used, and the resulting particulate polymer B had a glass-transition temperature of 100° C., a degree of swelling in electrolysis solution of a factor of 13, and a volume-average particle diameter of 530 nm.

The measurements and evaluations were then performed in the same manner as for Example 1. The results are listed in Table 1.

Comparative Example 2

The particulate polymer A, particulate polymer B, composition for an adhesive layer of a non-aqueous secondary battery, adhesive layer-equipped separator for a non-aqueous secondary battery, electrode for a non-aqueous secondary battery, and non-aqueous secondary battery were produced in a way similar to Example 1 except that in the preparation of the particulate polymer B, the methyl methacrylate was changed to 45 parts and the butyl acrylate was changed to 50 parts, and the resulting particulate polymer B had a glass-transition temperature of 15° C., a degree of swelling in electrolysis solution of a factor of 25, and a volume-average particle diameter of 530 nm.

The measurements and evaluations were then performed in the same manner as for Example 1. The results are listed in Table 1.

Comparative Example 3

The particulate polymer A, particulate polymer B, composition for an adhesive layer of a non-aqueous secondary battery, and adhesive layer-equipped separator for a non-aqueous secondary battery were produced in a way similar to Example 1 except that in the preparation of the particulate polymer A, 67 parts of styrene, 30 parts of 2-ethylhexyl acrylate (2-EHA), and 3 parts of acrylic acid were used instead of the monomers used in Example 1. Because the adhesive layer in the produced adhesive layer-equipped separator for a non-aqueous secondary battery suffered from dusting, neither the electrode for a non-aqueous secondary battery nor the non-aqueous secondary battery was produced.

The obtained particulate polymer A had a glass-transition temperature of 44° C., a degree of swelling in electrolysis solution of a factor of 2.0, and a volume-average particle diameter of 300 nm.

The glass-transition temperature, volume-average particle diameter, degree of swelling in electrolysis solution, and adhesiveness between the separator and adhesive layer were evaluated in the same manner as for Example 1. The results are listed in Table 1.

In Table 1 below, the following abbreviations are used.
"ACL" indicates an acrylic-based polymer.
"SBR" indicates a styrene-butadiene copolymer.

TABLE 1

| | | | Example 1 | Example 2 | Example 3 | Example 4 | Example 5 | Example 6 | Example 7 | Example 8 | Example 9 |
|---|---|---|---|---|---|---|---|---|---|---|---|
| Composition for adhesive layer of non-aqueous secondary battery | Particulate polymer A | Type | ACL | ACL | ACL | ACL | SBR | ACL | ACL | ACL | ACL |
| | | Content (parts by mass) | 50 | 50 | 50 | 50 | 50 | 15 | 25 | 65 | 75 |
| | | Glass-transition temperature $Tg_A$ (° C.) | −37 | −37 | −37 | −48 | 13 | −37 | −37 | −37 | −37 |
| | | Volume-average particle diameter $D_A$ (nm) | 380 | 380 | 380 | 400 | 220 | 380 | 380 | 380 | 380 |
| | | Degree of swelling in electrolysis solution (factor) | 4.0 | 4.0 | 4.0 | 3.5 | 3.2 | 4.0 | 4.0 | 4.0 | 4.0 |
| | Particulate polymer B | Type | ACL | ACL | ACL | ACL | ACL | ACL | ACL | ACL | ACL |
| | | Content (parts by mass) | 100 | 100 | 100 | 100 | 100 | 100 | 100 | 100 | 100 |
| | | Glass-transition temperature $Tg_B$ (° C.) | 47 | 35 | 58 | 47 | 47 | 47 | 47 | 47 | 47 |
| | | Volume-average particle diameter $D_B$ (nm) | 500 | 450 | 530 | 500 | 500 | 500 | 500 | 500 | 500 |
| | | Diameter ratio $D_B/D_A$ (factor) | 1.32 | 1.18 | 1.39 | 1.25 | 2.27 | 1.32 | 1.32 | 1.32 | 1.32 |

TABLE 1-continued

|  |  |  |  |  |  |  |  |  |  |  |
|---|---|---|---|---|---|---|---|---|---|---|
| Production conditions |  | Degree of swelling in electrolysis solution (factor) | 18 | 20 | 17 | 18 | 18 | 18 | 18 | 18 | 18 |
|  |  | Substrate on which adhesive layer is formed | separator | separator | separator | separator | separator | separator | separator | separator | separator |
|  |  | Process adhesion temperature T (° C.) | 60 | 60 | 60 | 60 | 60 | 60 | 60 | 60 | 60 |
|  |  | T − $Tg_B$ (° C.) | 13 | 25 | 2 | 13 | 13 | 13 | 13 | 13 | 13 |
| Evaluation categories | Blocking resistance |  | A | B | A | B | A | A | A | B | B |
|  | Adhesiveness with substrate |  | A | A | A | A | B | B | B | A | A |
|  | Process adhesiveness |  | A | A | B | A | B | C | B | A | A |
|  | Low-temperature output characteristics |  | A | A | A | A | A | A | A | B | C |

|  |  |  | Example 10 | Example 11 | Example 12 | Example 13 | Example 14 | Comparative Example 1 | Comparative Example 2 | Comparative Example 3 |
|---|---|---|---|---|---|---|---|---|---|---|
| Composition for adhesive layer of non-aqueous secondary battery | Particulate polymer A | Type | ACL | SBR | ACL | ACL | ACL | ACL | ACL | ACL |
|  |  | Content (parts by mass) | 50 | 50 | 50 | 50 | 50 | 50 | 50 | 50 |
|  |  | Glass-transition temperature $Tg_A$ (° C.) | −37 | 10 | −37 | −37 | −37 | −37 | −37 | 44 |
|  |  | Volume-average particle diameter $D_A$ (nm) | 380 | 200 | 380 | 380 | 380 | 380 | 380 | 300 |
|  |  | Degree of swelling in electrolysis solution (factor) | 4.0 | 2.0 | 4.0 | 4.0 | 4.0 | 4.0 | 4.0 | 2.0 |
|  | Particulate polymer B | Type | ACL | ACL | ACL | ACL | ACL | ACL | ACL | ACL |
|  |  | Content (parts by mass) | 100 | 100 | 100 | 100 | 100 | 100 | 100 | 100 |
|  |  | Glass-transition temperature $Tg_B$ (° C.) | 46 | 47 | 47 | 47 | 47 | 100 | 15 | 47 |
|  |  | Volume-average particle diameter $D_B$ (nm) | 470 | 500 | 500 | 500 | 500 | 530 | 530 | 500 |
|  |  | Diameter ratio $D_B/D_A$ | 1.24 | 2.50 | 1.32 | 1.32 | 1.32 | 1.39 | 1.39 | 1.67 |
|  |  | Degree of swelling in electrolysis solution (factor) | 8.0 | 18 | 18 | 18 | 18 | 13 | 25 | 18 |
| Production conditions |  | Substrate on which adhesive layer is formed | separator | separator | positive electrode | separator | separator | separator | separator | separator |
|  |  | Process adhesion temperature T (° C.) | 60 | 60 | 60 | 30 | 80 | 60 | 60 | — |
|  |  | T − $Tg_B$ (° C.) | 14 | 13 | 13 | −17 | 33 | −40 | 45 | — |
| Evaluation categories | Blocking resistance |  | A | A | A | A | A | A | C | * |
|  | Adhesiveness with substrate |  | A | B | A | A | A | A | A | C |
|  | Process adhesiveness |  | A | B | B | C | A | D | A | * |
|  | Low-temperature output characteristics |  | B | B | A | A | B | B | C | * |

*particles of adhesive layer detached, measurement/evaluation impossible

As is clear from Table 1, particles of the adhesive layer detached from the separator in Comparative Example 3, which used a particulate polymer A with a glass-transition temperature exceeding 20° C. Hence, this adhesive layer could not fulfill its function.

Furthermore, it is clear that Examples 1 to 14, which used a particulate polymer A with a glass-transition temperature no higher than 20° C. and a particulate polymer B with a glass-transition temperature of at least 30° C. and less than 60° C., had both better blocking resistance and process adhesiveness than Comparative Examples 1 and 2, which used a particulate polymer B with a glass-transition temperature outside of the aforementioned range.

INDUSTRIAL APPLICABILITY

The present disclosure can provide an adhesive layer for a non-aqueous secondary battery that can achieve both high process adhesiveness and high blocking resistance in battery members such as an electrode and a separator and can provide a composition for an adhesive layer of a non-aqueous secondary battery capable of forming this adhesive layer.

The present disclosure can also provide an adhesive layer-equipped separator for a non-aqueous secondary battery, and an adhesive layer-equipped electrode for a non-aqueous secondary battery, that have both high process adhesiveness and high blocking resistance.

The present disclosure can also provide a non-aqueous secondary battery with excellent cell characteristics, such as output characteristics, and a method for producing a non-aqueous secondary battery that allows production of the non-aqueous secondary battery while improving the process adhesiveness and blocking resistance of the battery members.

The invention claimed is:

1. A composition for an adhesive layer of a non-aqueous secondary battery, the composition comprising:
    a particulate polymer A and a particulate polymer B, wherein
    the particulate polymer A has a glass-transition temperature of no higher than 20° C. and a volume-average particle diameter of at least 100 nm and less than 450 nm, the particulate polymer B has a glass-transition temperature of at least 30° C. and no higher than 55° C. and a volume-average particle diameter larger than the volume-average particle diameter of the particulate polymer A, and the volume-average particle diameter of the particulate polymer B is at least 400 nm and no greater than 900 nm.

2. The composition for an adhesive layer of a non-aqueous secondary battery of claim 1, wherein a content of the particulate polymer A is at least 20 parts by mass and no greater than 70 parts by mass per 100 parts by mass of the particulate polymer B.

3. The composition for an adhesive layer of a non-aqueous secondary battery of claim 1, wherein a degree of swelling in electrolysis solution of the particulate polymer A is at least a factor of 1 and no greater than a factor of 10.

4. The composition for an adhesive layer of a non-aqueous secondary battery of claim 1, wherein a degree of swelling in electrolysis solution of the particulate polymer B is at least a factor of 6.

5. An adhesive layer for a non-aqueous secondary battery, the adhesive layer being formed by using the composition for an adhesive layer of a non-aqueous secondary battery of claim 1.

6. An adhesive layer-equipped separator for a non-aqueous secondary battery, the adhesive layer-equipped separator comprising a separator and the adhesive layer for a non-aqueous secondary battery of claim 5 provided on at least one surface of the separator.

7. An adhesive layer-equipped electrode for a non-aqueous secondary battery, the adhesive layer-equipped electrode comprising an electrode and the adhesive layer for a non-aqueous secondary battery of claim 5 provided on at least one surface of the electrode.

8. A non-aqueous secondary battery comprising:
a positive electrode, a negative electrode, a separator, and the adhesive layer for a non-aqueous secondary battery of claim 5, wherein the adhesive layer for a non-aqueous secondary battery is arranged between the positive electrode and the separator and/or between the negative electrode and the separator.

9. A method for producing a non-aqueous secondary battery, the method comprising forming an adhesive layer for a non-aqueous secondary battery on at least one of a positive electrode, a negative electrode, and a separator using the composition for an adhesive layer of a non-aqueous secondary battery of claim 1.

* * * * *